United States Patent
Kostka et al.

(10) Patent No.: US 10,308,464 B2
(45) Date of Patent: *Jun. 4, 2019

(54) APPARATUS AND METHOD FOR DETERMINING A DISTANCE MEASURE ON WOUND-UP MATERIALS

(71) Applicant: Fraunhofer-Gesellschaft zur Foerderung der angewandten Forschung e.V., Munich (DE)

(72) Inventors: Guenther Kostka, Erlangen (DE); Peter Schmitt, Erlangen (DE); Oliver Scholz, Moehrendorf (DE); Ulf Hassler, Heilsbronn (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 124 days.

This patent is subject to a terminal disclaimer.

(21) Appl. No.: 15/138,200

(22) Filed: Apr. 25, 2016

(65) Prior Publication Data
US 2016/0236892 A1 Aug. 18, 2016

Related U.S. Application Data

(63) Continuation of application No. 14/494,542, filed on Sep. 23, 2014, now Pat. No. 9,322,642, which is a
(Continued)

(30) Foreign Application Priority Data

Aug. 19, 2008 (DE) .................. 10 2008 038 316

(51) Int. Cl.
*G01B 11/14* (2006.01)
*B65H 26/08* (2006.01)
(Continued)

(52) U.S. Cl.
CPC ......... *B65H 26/08* (2013.01); *B29D 30/3007* (2013.01); *B65H 18/08* (2013.01);
(Continued)

(58) Field of Classification Search
CPC combination set(s) only.
See application file for complete search history.

(56) References Cited

U.S. PATENT DOCUMENTS 5,546,330 A * 8/1996 Sergel ............ B29D 30/3007
156/134
RE37,007 E * 1/2001 Gerlier ............... B65H 9/002
250/548
(Continued)

FOREIGN PATENT DOCUMENTS

DE 3926721 A1 2/1991
DE 4129465 3/1993
(Continued)

*Primary Examiner* — Mohamed Charioui
(74) *Attorney, Agent, or Firm* — Perkins Coie LLP; Michael Glenn

(57) ABSTRACT

A distance measure between a beginning and an end of a material strip wound onto a body in a tangential direction can be determined by creating a height profile of a surface of the material strip, which covers the beginning and the end of the wound material strip in the tangential direction. If a position value of the beginning of the material strip is determined in the created height profile, the distance measure can be determined using this position value and the height profile covering the end of the material strip.

18 Claims, 6 Drawing Sheets

Related U.S. Application Data continuation of application No. 13/028,924, filed on Feb. 16, 2011, now Pat. No. 8,892,396, which is a continuation of application No. PCT/EP2009/005981, filed on Aug. 18, 2009.

(51) Int. Cl.
  *B29D 30/30* (2006.01)
  *G01B 11/02* (2006.01)
  *G01B 11/06* (2006.01)
  *B65H 18/08* (2006.01)
  *B65H 26/06* (2006.01)
  *B29D 30/42* (2006.01)
  *B29D 30/44* (2006.01)

(52) U.S. Cl.
  CPC ............ *B65H 26/06* (2013.01); *G01B 11/02* (2013.01); *G01B 11/06* (2013.01); *G01B 11/0608* (2013.01); *G01B 11/14* (2013.01); *B29D 2030/427* (2013.01); *B29D 2030/428* (2013.01); *B29D 2030/4437* (2013.01); *B29D 2030/4456* (2013.01); *B65H 2511/00* (2013.01); *B65H 2511/13* (2013.01); *B65H 2553/416* (2013.01); *B65H 2553/46* (2013.01)

(56) References Cited

U.S. PATENT DOCUMENTS

| | | |
|---|---|---|
| 6,443,385 B1 | 9/2002 | Grandauer et al. |
| 7,135,080 B2 * | 11/2006 | Shimizu ............ B29D 30/3007 156/123 |
| 2001/0008162 A1 | 7/2001 | Shimizu et al. |
| 2003/0174368 A1 * | 9/2003 | Katayama ............ B41J 11/003 358/490 |
| 2006/0076451 A1 * | 4/2006 | Biagiotti ............ B65H 19/2269 242/532.3 |
| 2007/0113948 A1 | 5/2007 | Shimizu et al. |
| 2009/0171494 A1 | 7/2009 | Wachter et al. |

FOREIGN PATENT DOCUMENTS

| | | |
|---|---|---|
| DE | 19726285 | 12/1998 |
| DE | 102005028231 | 2/2006 |
| EP | 0289101 | 11/1998 |
| EP | 1197317 | 4/2002 |
| JP | 01-197609 | 9/1989 |
| JP | 05-084849 | 4/1993 |
| JP | 06-023867 | 2/1994 |
| WO | 2004022323 | 3/2004 |

* cited by examiner

APPARATUS AND METHOD FOR DETERMINING A DISTANCE MEASURE ON WOUND-UP MATERIALS

CROSS-REFERENCE TO RELATED APPLICATIONS

This application is a continuation of U.S. patent application Ser. No. 14/494,542, filed Sep. 23, 2014, which is a continuation of U.S. patent application Ser. No. 13/028,924, filed Feb. 16, 2011, which issued on Nov. 18, 2014 as U.S. Pat. No. 8,892,396, which is a continuation of International Application No. PCT/EP2009/005981, filed Aug. 18, 2009, and additionally claims priority from German Application No. 102008038316.3, filed Aug. 19, 2008, each of which are incorporated in their entirety by this reference hereto.

BACKGROUND OF THE INVENTION

The present invention relates to an apparatus and a method for determining an overlap length of wound-up materials, and particularly to how the overlaps, which may occur at the end of winding up a material strip on a carrier body, can be determined reliably and with high precision.

Apparatuses and/or methods in which the overlap length of materials wound and/or applied onto a carrier in layers is to be determined are required in many applications.

For example, when laminating glass fiber mats or carbon fiber mats, the mats are applied in layers, wherein the layers must not abut each other bluntly, but rather should have a specified overlap for achieving maximum stability. This means that the new mat following a mat already applied is to cover the applied mat by a predetermined length at its contact area.

Similar problems may also arise when winding up band- or strip-shaped material on a carrier or a drum or a base body. In some such cases of application, such as winding up a cable and/or a winding of a coil or the like, it may also be necessary to determine the overlap of the end of the wound cable with the underlying sheets, so as to obtain a coil with a particularly homogenous magnetic field, for example, in which the overlap of the last winding is approximately zero. This may be particularly relevant in coils with few individual windings.

A broad field of application, for example, also is the manufacturing process of car tires, wherein individual strip- or band-shaped rubber sheets are wound onto a base body, for example, or to the casing already put up. For example, the base body may be a drum of cylindrical geometry or another rotation-symmetrical body consisting of individual straight segments, the circumference of which has a circular and/or cylindrical envelope. What is to be achieved as a final product here is a tire having a thickness as constant as possible perpendicular to its circumference, the wall thickness of which is thus as uniform as possible so as to avoid height run-out in the finished product, for example. Typically, the most diverse materials are combined with each other here so that, in some manufacturing methods, band- and/or strip-shaped rubber strips of predetermined lengths are wound onto a rotating carrier, wherein the end of the strip-shaped wound material may overlap with the beginning of the same material strip. This overlap may be intended, but its overlap length, i.e. generally speaking that region in which the beginning and the end of the same material strip usually overlap, needs to satisfy exactly predefined geometric boundary conditions.

On the one hand, the length in the tangential direction, i.e. along the expansive dimension or winding direction of the material strip, may here be regarded as the overlap length. Alternatively, also the offset that may develop due to the fact that the material strip is not superimposed identically at the beginning and at the end transversely to its winding direction (in the width direction), i.e. in the axial direction parallel to the axis of the rotating body, may also be regarded as the overlap length.

Generally speaking, it is often required to determine geometrical properties of the wound material and/or the surface of the wound material. Among other things, negative overlap lengths, i.e. gaps in the surface developing when the wound material is too short, may also be of interest here. An offset of a wound material between the beginning and the end of the winding also often has to be controlled. Generally, it is often required to determine a distance measure between certain characteristic points of a wound-up material strip, as well as the distance measure between the beginning (starting edge) and the end (end edge) of the material strip, for example.

In other words, for example, various material sheets are wound successively onto a tire construction drum in the production of vehicle tires, for example. Here, faulty overlap lengths of the various materials may develop, which may significantly affect the mechanical properties, and hence the stability, of the tire. Detection of such faulty conditions, particularly of open splice (the gap or overlap between the beginning and the end), and correction and/or segregation of such wound material is hence desirable. An open splice is to be understood as the condition in which the material strip does not overlap at all with the beginning of the material strip at its end, so that an area not covered by wound material is obtained.

One difficulty in the measurement of the overlap length of overlapping materials is that only the material end edge is still visible on the outside after the winding operation, because the starting edge of the material itself is covered in the end and/or overlap area. This results in the fact that it is not possible to perform exact measurement of the overlap length merely due to the measurement of the overlap area itself.

Previously, for checking the overlap length during the industrial fabrication, for example human examiners, who performed a subjective assessment of the overlap length after the finished winding, were often employed. On the other hand, it has been attempted to employ measurement methods and/or sensors working point by point, which generate a binary output signal, i.e. in which the sensor itself immediately detects the presence of an edge.

For example, this may be achieved by way of optical sensors, which react to the brightness change caused by reflected light on a sensor. If a new sheet is applied and/or a sheet overlaps, the point at which irradiated light is reflected approaches the stationary sensor so that it detects an altogether increased radiation intensity. When a certain limit value is exceeded, the detector then indicates the presence of an edge. Apart from the fact that such a sensor works either point by point or that it is only possible to determine a few measurement points this way in materials having a certain width, these binarily working methods cannot be employed without extended control logic, among other things, in the control of a frequently occurring scenario, the measurement of the overlap length of so-called "blunt splices", i.e. of wound materials with a target overlap length of 0. In the normal case of the desired seamless transition, such a sensor cannot detect an edge, so that the following evaluation logic obtains an invalid input signal.

Even if the logic could interpret such a missing input signal correctly, applications in which the wound material does not have any abrupt starting or end edge, e.g. because it is chamfered, could not be controlled satisfactorily with such sensors. In some applications, such an edge-detecting sensor is used to first detect the starting edge of the material strip to be wound up during a winding process, wherein the associated angular position of the drum is detected by means of an angular measurement means at the same time. After winding up the material and/or during winding up, the end edge of the material strip is detected after (approximately) a single drum revolution, and the associated angular position of the drum is detected at the same time. From the difference of the two absolute angular positions of the drum and the mandatorily previously known drum radius, the length of the material strip is determined, and then the resulting overlap length of the material is calculated if the drum circumference is known.

In some application scenarios partially already discussed briefly above, such a method and/or such an apparatus implementing such a method cannot lead to any positive result. If the material and/or the material beginning does not start abruptly with a perpendicular edge, for example, but is cut flat (i.e. starts with a cutting angle in the tangential direction of <45°, for example), unequivocal determination of a position value of the starting edge cannot be performed. Frequently used angular drums and/or base bodies, which are structured such that individual axially parallel segments alternate with interposed open gaps, per se have a multiplicity of successive edge structures, so that the application of the above-described method is not possible here. This is the case even in a continuous, i.e. for example round surface of the winding drum if material strips already wound previously have an overlap, and hence lead to an end edge.

In the "blunt splice" case of application and with obliquely cut material, recognition of the material end edge, and hence measurement of the material overlap, is thus not possible either, since the starting and end edges virtually join seamlessly in the error-free case, and hence there is no detectable edge. When cut obliquely, a slight overlap, which leads to only a minimal, but possibly already disturbing height difference, cannot be detected if the height difference lies below the threshold value limit of the edge-sensitive method.

Basically, in these conventional methods, the end edges often cannot be determined and/or unambiguously associated because of structures due to material overlap from the material preparation, from the underlying sheets, and because of other spurious effects, such as wrinkling, material structuring, drum structuring, etc. The detection of material properties in the axial direction is not possible either in these methods.

Hence, there is the need to provide an apparatus and/or a method allowing for more reliable measurement of wound-up materials strips with respect to geometrical features, such as distance measures.

SUMMARY

According to an embodiment, a method of determining a distance measure between a beginning and an end of a material strip wound onto a body in a tangential direction by a winding operation may have the steps of: creating a height profile of a surface of the material strip, which covers the beginning and the end of the wound material strip in the tangential direction; determining a position value of the beginning of the material strip in the created height profile; and determining the distance measured by using the position value of the beginning and the height profile covering the end of the material strip, wherein the height profile is created during the winding operation, wherein height information associated with respective position values is determined and stored for a plurality of position values known or being equidistant in a tangential direction, and wherein the step of determining has extrapolating the position value of the beginning of the material strip to an extrapolated position value by adding a complete revolution of the body to the position value, performing an analysis of the position values only in a range surrounding the extrapolated position value in order to find a position value of the end of the material strip, so that the end of the material strip is logically distinguished from artifacts occurring outside of the range surrounding the extrapolated position value, and determining, as the distance measure, a tangential distance between the position value of the beginning of the material strip and the position value of the end of the material strip.

According to another embodiment, an apparatus for determining a distance measure between a beginning and an end of a material strip wound onto a body in a tangential direction by a winding operation may have: a sensor device formed to create a height profile of a surface of the material strip, which covers the beginning and the end of the wound material strip in a tangential direction; evaluating means formed to analyze the height profile so as to determine a position value of the beginning of the material strip in the height profile; and determining means formed to determine the distance measure using the position value of the beginning and the height profile covering the end of the material strip; wherein the height profile is created during the winding operation, wherein height information associated with respective position values is determined and stored for a plurality of position values known or being equidistant in a tangential direction, and wherein the determining means is configured to extrapolate the position value of the beginning of the material strip to an extrapolated position value by adding a complete revolution of the body to the position value, to perform an analysis of the position values only in a range surrounding the extrapolated position value in order to find a position value of the end of the material strip, so that the end of the material strip is logically distinguished from artifacts occurring outside of the range surrounding the extrapolated position value, and to determine, as the distance measure, a tangential distance between the position value of the beginning of the material strip and the position value of the end of the material strip.

Another embodiment may have a computer program with a program code for performing the above method of determining a distance measure between a beginning and an end of a material strip wound onto a body in a tangential direction by a winding operation, when the program is executed on a computer.

According to another embodiment, a system for winding a material strip onto a body in a tangential direction by a winding operation may have: rotation means coupled to the body and formed to set the body to rotation in a tangential direction and wind up the material strip; and a control device for determining a distance measure between a beginning and an end of the material strip wound onto the body in the tangential direction, having: a sensor device formed to create a height profile of a surface of the material strip, which covers the beginning and the end of the wound material strip in a tangential direction; evaluating means formed to analyze the height profile so as to determine a position value of the beginning of the material strip in the height profile; and determining means formed to determine the distance measure using the position value of the beginning and the height profile covering the end of the material strip, wherein the height profile is created during the winding operation, wherein height information associated with respective position values is determined and stored for a plurality of position values known or being equidistant in a tangential direction, and wherein the determining means is configured to extrapolate the position value of the beginning of the material strip to an extrapolated position value by adding a complete revolution of the body to the position value, to perform an analysis of the position values only in a range surrounding the extrapolated position value in order to find a position value of the end of the material strip, so that the end of the material strip is logically distinguished from artifacts occurring outside of the range surrounding the extrapolated position value, and to determine, as the distance measure, a tangential distance between the position value of the beginning of the material strip and the position value of the end of the material strip.

According to some embodiments of the present invention, this is made possible during the winding of a material strip that is wound onto a body in a tangential direction by creating a height profile of the surface of the material strip, covering both the beginning and the end of the wound material strip in the tangential direction.

In the height profile, the position of the beginning and/or a position value for the beginning of the material strip is then determined, so that a distance measure between the beginning and the end of the material strip may then be determined precisely using this position and the height profile covering the end.

It is to be pointed out that, in the following discussion, mainly an overlap of the wound material strip is determined as the distance measure. This is done for reasons of simple illustration. Nevertheless, any distance measure on the surface of the wound material strip is, of course, to be understood by the term "distance measure", for example the distance of the beginning and the end of the material strip if there is no overlap, i.e. if a gap in the surface develops between the beginning and the end of the material strip. In general, the distance measure and/or the value associated therewith may become positive, negative or also zero, in arbitrary units or in SI units. If a distance measure of zero is determined, this means a perfectly blunt splice, i.e. material wound together seamlessly. In many fields of application, this represents the ideal. Of course, the term "distance measure" is not to be limited exclusively to distances in a tangential direction, but rather arbitrary distance measures in any orientation may also be determined and serve for quality control. For example, an offset of the material strip in the axial direction, i.e. in the direction perpendicular to the tangential direction, can be detected with some embodiments of the inventive method and/or inventive apparatus.

Through the use of a height profile created in the tangential direction, it is possible to be sensitive not only to abrupt edges, but to any form of the beginning of the wound material strip, such as the flat incline of cut material. By creating a height profile, it is also made possible to detect arbitrary (edge) shapes at the end of the material, and particularly also positively detect the presence of a blunt splice. This is the case if no elevation or depression shows in the height profile near the position of the beginning of the material strip following a complete winding, i.e. the surface of the wound material strip does not have any depression or superelevation.

Of course, in applications in which there is an overlap, the position of the end of the material strip and/or an end edge of the material strip in the height profile may also be determined with utmost accuracy.

In other words, the height profile determined distinguishes itself by having at least two, but in some embodiments a multiplicity of height values in the tangential direction, which are each associated with measurement positions (position values) and/or measurement locations or pixels in a tangential direction. In the simplest case, a one-dimensional height profile thus may be visualized by plotting the height measurement values versus the measurement positions depicted on the X-axis of a coordinate system. Of course, evaluation of the height profile is also possible without such visualization.

In some embodiments, a two-dimensional height profile is created, which may conceptionally be understood as a plurality of one-dimensional height profiles extending across the entire width (in a width direction) of the material strip to be measured, i.e. are adjacent to each other in the axial direction (width direction). For example, this may be achieved with a height sensor working line by line, which generates a plurality of measurement points across the entire width.

In some embodiments, the height profile is created by contactless measurement. For example, this has the advantage of quick and wearless measurement. In some embodiments, a light sectioning measurement method is used for this, and spatially resolved ultrasound distance methods or pulse echo methods can be used in other embodiments. In other embodiments, tactile methods can be used, wherein a plurality of adjacently arranged measurement sensors are arranged on the surface of the material strip, for example, so as to record a height profile. In the methods, in general, a change in the height of the wound-up material is detected, be it due to a variation of the distance of the surface of the material strip to the detector observed or directly by scanning or the like. In alternative embodiments, pressurized air sensors determining a change in distance to a surface via a change in air pressure of a stream between material strips and the sensor may also be employed.

In some embodiments, for reasons of computational savings, a height profile is created only in the areas of the beginning and/or the end, with no height profile being created in the area lying therebetween. The approximate position of the beginning and/or of the end may, for example, be given to the measurement system by way of external trigger signals. For example, the beginning of feeding the material strip onto the drum may be used to commence a measurement operation including the beginning of the material strip, wherein the knowledge of the rotation speed of the drum may again be used to predict the end and/or the end time instant once the winding operation has started, in order to trigger the creation of a height profile in the end region, which includes the end of the material strip in any case.

Detecting the beginning or a starting edge as well as detecting and/or determining an end or an end edge may here take place in the most diverse ways, since all relevant information is present and may be evaluated due to the creation of the height profile. Here, it would be a simple and not computationally intensive method to define a threshold value indicating the presence of an edge if it is exceeded. For example, if a height difference exceeding the threshold value is determined between two neighboring measurement positions, an edge can be indicated and/or detected.

In alternative methods sensitive to more complicated starting forms of the material strip, a parametrization and/or a function describing the edge or a start course may be fitted to the height profile to infer the exact position from optimum parameters determined during the fitting. For example, a staircase function with a smeared edge can be fitted to the height profile, wherein the position of half the incline of the staircase function could be associated with the position of the edge. This has the advantage that the height values in the immediate surroundings of the position of the start or the end also contribute to the determination of this position, and the accuracy of the position determination is increased significantly thereby. Generally speaking, by at first creating a height profile, which contains an object region of interest, such as the starting or end region, more information may be used for finding the beginning or the end of the material strip than this is the case in the previously employed methods. Accordingly, both the beginning and the end can be found with greater accuracy and/or at all in the first place.

In further embodiments of the present invention, the two-dimensional height profile of the surface of the material strip is recorded during a winding process, for example with the aid of a light sectioning measurement method. In other words, this means that a two-dimensional height profile having several measurement tracks is created, with each measurement track containing a one-dimensional height profile along the tangential direction. The measurement tracks generated are thus arranged in parallel and next to each other in a direction running perpendicularly to the tangential direction. This means that the entire width of the material strip to be wound up is detected simultaneously with a plurality of measurement tracks, so that the information on the course of the beginning of the material strip may be acquired across the entire width thereof in the reconstruction.

In the two-dimensional height profile thus created, basically any arbitrary surface structure may be found and/or determined. The created height profile thus allows for a multiplicity of measures for quality control.

Here, the detection accuracy may even be increased in various ways, for example by at first determining separately, in one dimension, a position of the beginning and the end of the material strip or each of the measurement tracks. By way of correlation between the various measurement tracks, enhanced detection security of the material edge course sought and/or the course of the beginning and of the end of the material strip can be achieved. One example of this would be smoothing the edge course by weighting the position and/or the position value found of the beginning or of the end with the position values of neighboring measurement tracks for the currently considered pixels and/or for the currently considered measurement track. Alternatively, simple consistency tests may also take place, in which it is checked as to whether the position value found in the neighboring measurement track lies within a sensible interval around the position value of the currently considered measurement track. Furthermore, by creating a two-dimensional height profile, it becomes possible to detect the course of the beginning or the end across the entire axial width of the material strip. Hence, overlap lengths can be determined in a spatially resolved manner, i.e. the overlap lengths partially varying strongly across the width of the material strip can be measured accurately.

Furthermore, when creating a two-dimensional height profile, it is possible to determine further measurement values in an axial or a width direction, such as the overall width of the material strip, the material offset or acentricity. Furthermore, it is also possible to determine the orientation of the splice angle, i.e. the orientation of the splice edge with respect to the tangential or axial direction. Particularly in tire production, this is often desirable because material strips which are cut pointedly, i.e. have an angle that may be up to 80° or even greater with respect to the tangential direction, may be put on here. Even in the case of a splice covering the entire circumference, the splice can be detected reliably in its entire length when creating a two-dimensional height profile.

Furthermore, it is possible to recognize also other types of errors in the recorded height profile. Examples of this may be folded-over material corners, wrinkles, an open splice at the material edge and other irregularities.

Furthermore, by recording the height profile, it is not absolutely necessary to provide control of the winding device originating from the apparatus for creating the height profile, or, conversely, control of the apparatus for creating the height profile by the winding device. This is due to the fact that a direct relation between the winding progress, i.e. the absolute angular position of a winding drum for example, and the condition of the data capturing detector or sensor creating the height profile does not have to exist at any time. So as to allow for conversion of the initially dimensionless position values of the height profiles into length values, at first it is only necessary for the individual height values in the height profile to be captured in known portions—in a tangential direction. This may, for example, be achieved by the winding means working at a constant rotational frequency, while height values for the height profile are generated at constant time intervals completely independently of the winding means. At a constant rotational speed of the winding apparatus, the clocking of the individual capturing steps for creating a height value can be determined freely. Then, the length scale in the height profile can be created by way of a single geometrical factor, so that, without a direct connection between the winding apparatus and a control device for determining the overlap length, it is possible to determine the overlap length in absolute length units from the height profile with high precision.

In summary, some embodiments of the present invention allow for secure detection of starting and end edges or the beginning and the end of wound material strips, also in the case of obliquely cut material edges and blunt splices. Creating a height profile here also serves to avoid faulty measurement. In 2-dimensional height profiles, properties are also determined in a non-tangential direction (e.g. material width, offset, measurement of the splice angle and/or axial direction), and the detection of other winding faults (fold-over of material corners, wrinkling, faulty preparation splices, etc.) is made possible. Some of the embodiments of the present invention will be described in greater detail in the following with reference to the accompanying figures, in which:

BRIEF DESCRIPTION OF THE DRAWINGS

Embodiments of the present invention will be detailed subsequently referring to the appended drawings, in which.

DETAILED DESCRIPTION OF THE INVENTION

Figure 1:
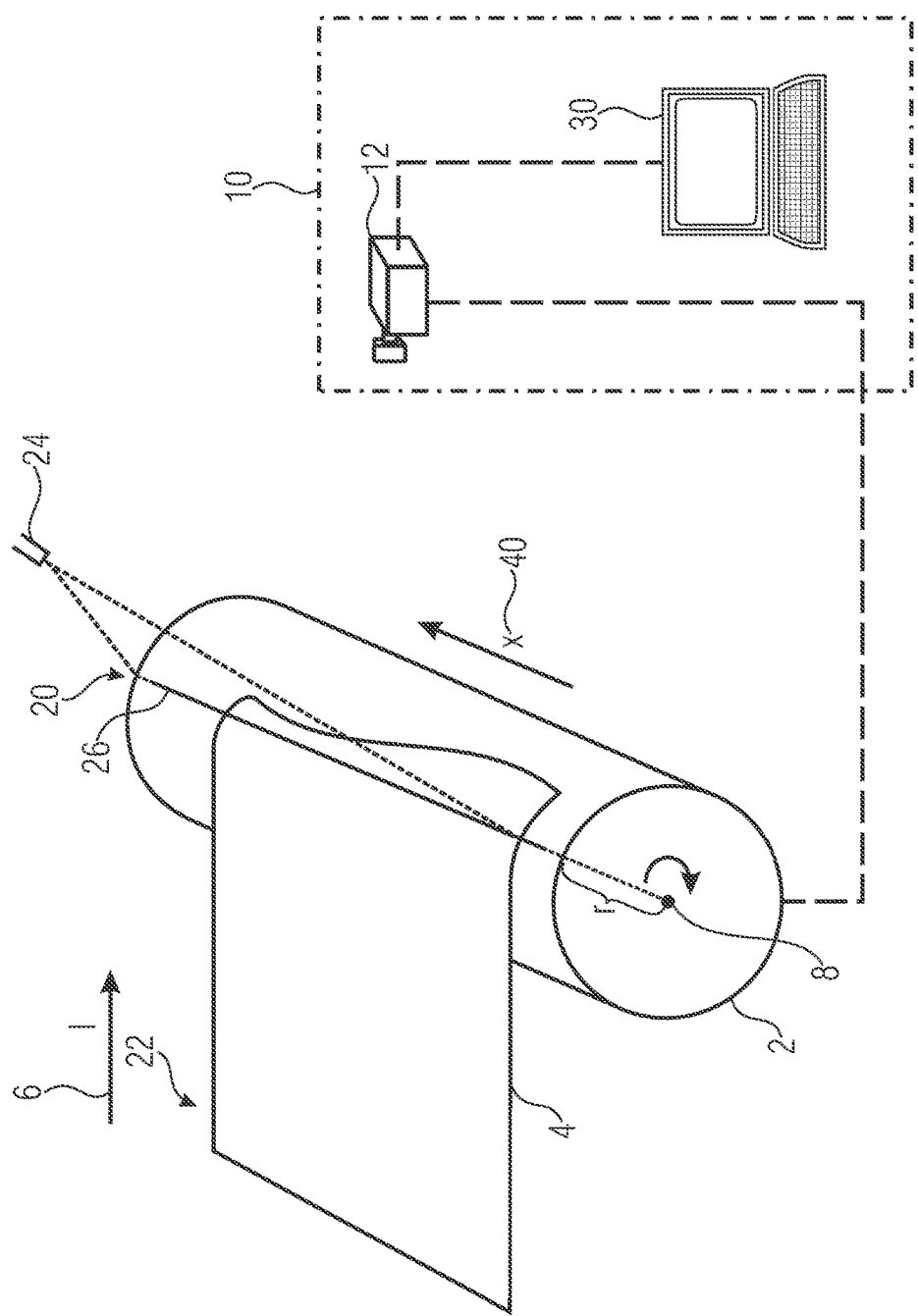
FIG. 1 shows an embodiment of a system for winding a material strip onto a body.

FIG. 1 shows an embodiment of a system allowing for winding a material strip onto a body, wherein the system includes a control device for determining the overlap length of the material strip wound onto the body.

FIG. 1 shows an example of a rotation means 2, which is suited for winding a material strip 4 onto a body in a tangential direction 6. In the simple example shown in FIG. 1, the rotation means 2 consists of a cylindrical drum pivoted rotatably about a central axis 8, on the surface of which the material strip 4 is being wound. The body, onto which the material strip 4 is being wound, is thus formed by the rotation means 2 itself. In alternative embodiments, however, the body may, of course, be formed separately from the device causing the rotation.

The system further comprises a control device 10 for determining an overlap length of the material strip 4 wound onto the body in the tangential direction 6. The control device 10 comprises a sensor device 12 suited to create a height profile of the surface of the material strip covering a beginning 20 and an end 22 of the wound material strip 5 in the tangential direction 6. In the example shown in FIG. 1, the sensor device 12 is implemented as a light sectioning measurement means, which records a measurement light line 26 projected onto the surface of the material strip 4 by means of a laser or another light source 24 and creates a height profile of the surface of the material strip 4 therefrom, as will be explained in greater detail in the subsequent figures. Briefly anticipating this explanation, the height profile consists of a plurality of known measurement positions in a tangential direction and height values respectively associated therewith.

Known measurement positions in the sense of the previous paragraph, for example, may be equidistant measurement positions, i.e. a series of measurement positions having a previously known, constant distance in a tangential direction. In other embodiments, the measurement positions may indeed be known, but are not necessarily equidistant. Thus, for example, the distance of neighboring measurement positions in the areas of particular interest, in which an overlap and/or the beginning and the end of the material strip are expected, may be chosen to be particularly small, in order to achieve high spatial resolution at these locations. In the areas lying therebetween, in some embodiments of the present invention, the spatial resolution is reduced in a tangential direction by increasing the distance between neighboring measurement positions. This allows for observing the entire surface at a reduced computational effort, in order to discover more severe faults, for example, while employing the highest spatial resolution only in the areas of the distance measure to be determined.

The control device 10 further includes evaluating means 30 to analyze the height profile and determine a position value of the beginning of the material strip in the height profile. In the embodiment shown in FIG. 1, the evaluating means 30 further comprises evaluation or determining means (not illustrated) for determining the overlap length using the position value of the beginning as well as the height profile covering the end of the material strip when the material strip 4 is completely wound onto the body.

In the case shown in FIG. 1, the evaluating means and the evaluation or determining means are thus combined in one housing, wherein the two may, for example, be implemented in software or in dedicated computer hardware, in order to determine the overlap length of the material strip, as described in the following figures, for example.

In the case shown in FIG. 1, the sensor device 12 is further coupled to the rotation means 2 to allow for synchronization. This coupling is optional, however, since direct coupling of the rotations means 2 and the sensor device 12 is not necessary due to recording the height profile, as long as both are operated in a stationary manner.

Furthermore, it is assumed in FIG. 1 that the light sectioning projection and/or the projection of the measurement line 26 is generated by a laser 24 irradiating onto the rotation means 32 in a radial direction. In alternative embodiments it is, of course, also possible to vary the direction from which the measurement light projection is generated, in order to increase the height resolution of the light sectioning measurement means, for example.

FIGS. 2 to 5 illustrate, on the basis of the system shown schematically in FIG. 1, how embodiments of devices for determining an overlap length may be implemented to recognize, with high precision, the overlap length of a material strip 4 wound onto the body 2 in the tangential direction 4. Here, for reasons of generality, a light sectioning measurement method allowing for creating a two-dimensional height profile of the surface of the material strip 4 is illustrated. In this connection, it is to be mentioned that the inventive advantages are also obtained in a one-dimensional implementation, so that in the discussion of the height profiles, without limitation of generality, only one-dimensional height profiles are discussed, in order to be able to clearly illustrate the concept underlying the invention, without impeding the basic understanding through additional technical complications.

FIGS. 2, 4a, 4b and 5 show further embodiments. In the figures, a two-dimensional sectional view is shown of the apparatus shown in a perspective view in FIG. 1. The section of the apparatus shown in FIG. 1 may be at an arbitrary position along the width direction 40 parallel to the rotation axis 8 of the rotation means 2, i.e. perpendicular to the tangential direction 6.

Figure 2:
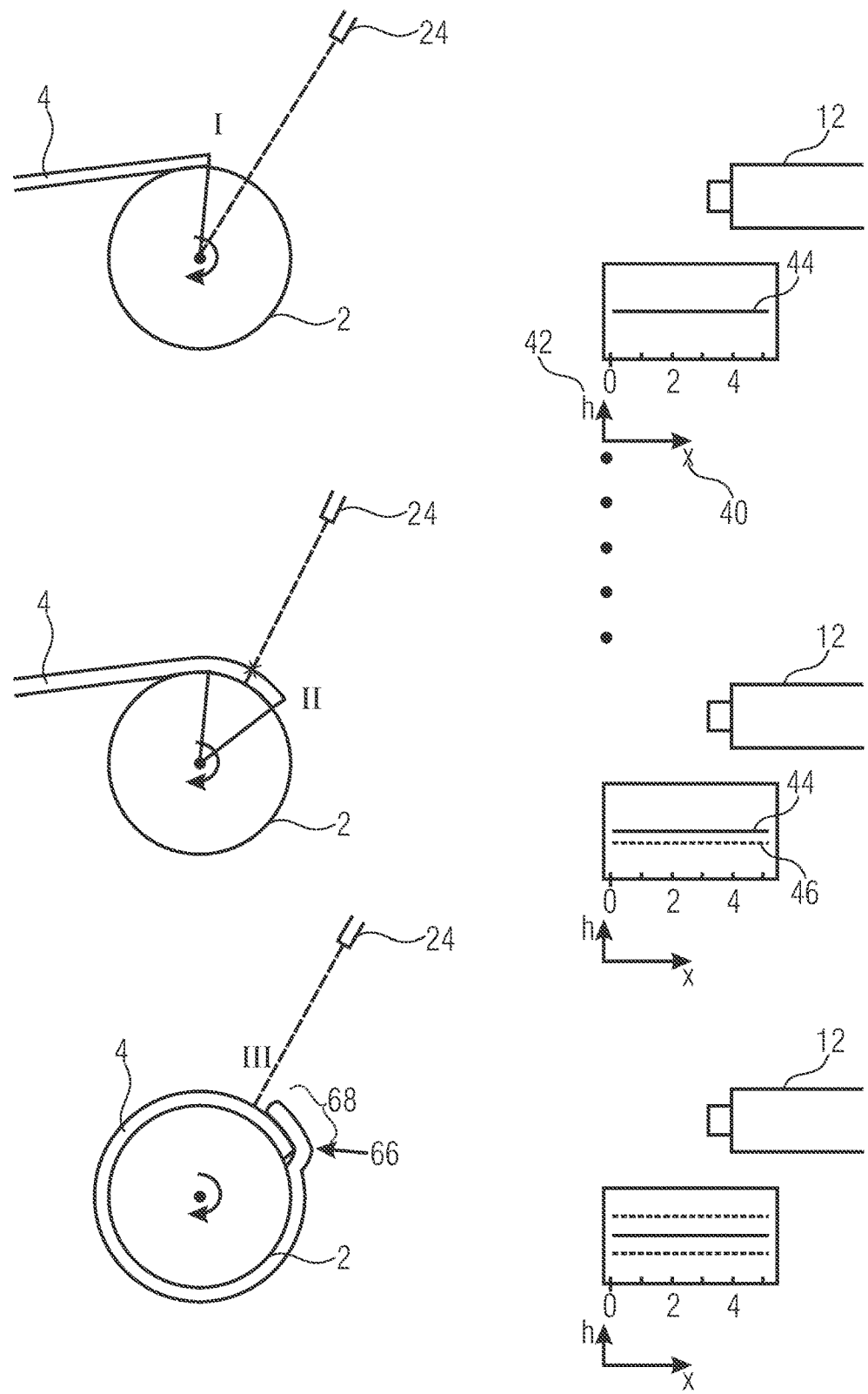
FIG. 2 shows an embodiment of a sensor device for creating a height profile.

FIG. 2 here shows, from top to bottom in this two-dimensional sectional view, three different stages of the winding process and the individual captures respectively associated therewith, which are assembled into a height profile passing in a tangential direction. Here, the concept of the light sectioning measurement, by means of which the height profile is created in this specific embodiment, will again be explained briefly.

Figure 3:
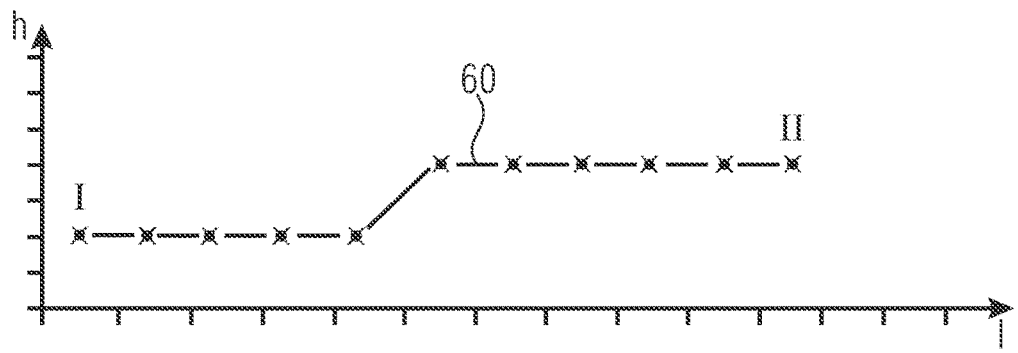
FIG. 3 shows examples of a height profile determined by means of the sensor device of FIG. 2.
Figure 3:
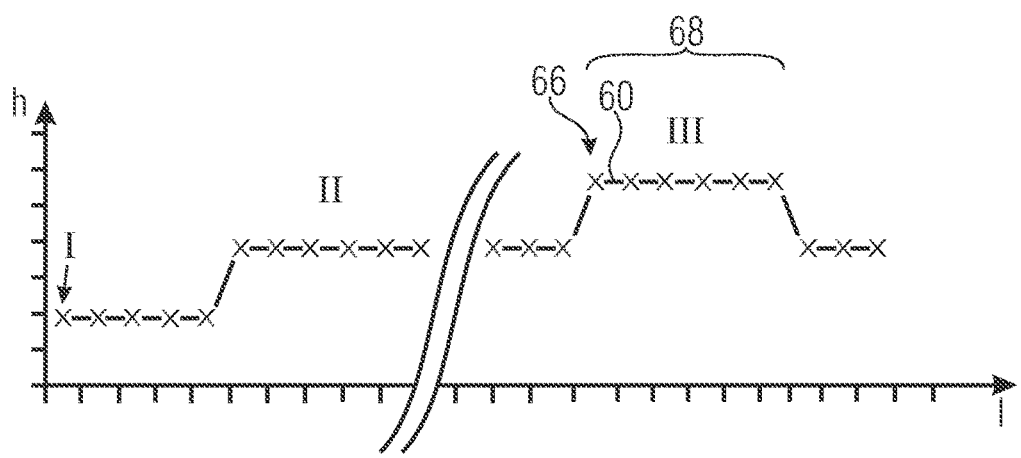

The positions in the one-dimensional height profiles associated with the individual positions I, II and III of the various partial images of FIG. 2 are also indicated in the height profiles schematically illustrated in FIG. 3. Without limitation of generality, it is assumed here that the laser 24 projects onto the cylindrical drum 2 in a radial direction. This projection, particularly the light point or the light line generating a reflection of the laser light on the surface of the drum 2 and/or the material strip 4 is recorded by means of the sensor device 12, i.e. with a light sectioning camera. The light sectioning camera 12 here records a two-dimensional image, which is characterized by the fact that the observed light line is imaged at a certain position on the two-dimensional sensor (for example CCD or CMOS). Here, the relative alignment between the sensor and the light projection is typically chosen such that a direction (the X-axis) corresponds to the width direction 40, whereas the Y-axis on the sensor corresponds to a provisional height value 42. In the illustration shown in the upper partial image of FIG. 2, it is simplistically assumed that the drum 2 is perfectly planar, i.e. the image in the sensor device 12 is a straight line 44. The middle partial image shows a configuration in which the starting edge or the beginning of the material strip 4 has been wound up to position 2. Due to the given geometry, in the case of an otherwise perfectly planar surface, the projection of the light measurement strip on the two-dimensional sensor will now yield a line 46, which corresponds to a greater (provisional) height value.

For illustrating the principle, the imaging location 44 of the two-dimensional sensor associated with the above configuration again is illustrated in dashed lines in the middle illustration of FIG. 2.

The upper illustration of FIG. 3 shows the illustration corresponding to the middle illustration of FIG. 2 of a one-dimensional height profile, which here is to be assumed to correspond to the third pixel of the two-dimensional sensor, i.e. to x values between two and three.

In other words, the illustration of the height profile shown at the top of FIG. 3 corresponds to the multiplicity of height values measured at the equidistant positions when producing the light sectioning capture. These position values are plotted on the X-axis of the height profile 60 in arbitrary units. The height values plotted on the Y-axis may here, for example, directly correspond to the (provisional) height values or pixel values determined on the 2-dimensional sensor in the height direction 42. In other embodiments, it is also possible that a conversion depending on the geometry of the arrangement in FIG. 2 of the height values h' observed on the sensor into radial height changes has already been performed before the height profile is created. Whether this is the case, will be neglected for the further discussion, since all embodiments may be implemented on the basis of both alternatives.

As can be taken from the above illustration of FIG. 3, the height value at position 1, corresponding to the 2-dimensional illustration of the measured line 44, is small, while rising to an again approximately constant level up to position 2, wherein the increase happens abruptly, as shown in FIG. 3, in the case of a sharp edge of the material strip 4 illustrated in FIG. 2, so that altogether the height profile shown at the top of FIG. 3 is obtained.

A position value of the beginning of the material strip 4 can now be determined directly from this height course with high precision, for example by using a threshold value criterion or fitting a suitable function and/or parametrization. The position value may here at first be determined in arbitrary, dimensionless units, wherein conversion into a length value in SI units on the basis of a geometrical factor may, for example, take place prior to creating the height profile or only after determining the overlap length. For example, if working at a constant image capture frequency at a constant rotational speed of the rotation means 2, this geometrical factor results from the number of captures per revolution and the radius of the rotation device, corrected by the change of the radius caused by material strips already wound onto the rotation device or body, if applicable.

A further example of how the position of an edge or an edge course can be determined is to determine and evaluate the gradient of the height profile. If the magnitude of the gradient exceeds a maximum or threshold value, it can be inferred therefrom that a jump in height is present, for example an edge. (The sign of the gradient may, for example, be used to determine the type of the edge.) In alternative embodiments, a window may further be set for the magnitude of the gradient, wherein, as a criterion for the presence of an edge or a beginning or an end a window, a window within which the magnitude of the gradient is to lie is determined. Thereby, it is made possible to separate other artifacts from the beginning and/or the end of a material strip. For example, certain materials may protrude steeply from the circumference of the wound material, so that the derivative at this location lies far above the threshold for a "normal" edge. By setting a window, such artifacts can be taken into account by then no longer leading to the detection of an edge. Additionally, in some embodiments, the orientation of the gradient vector can be used to further increase the accuracy of the edge detection.

In embodiments with one-dimensional height profiles, a derivative of the height profile can be performed in a tangential direction, so that when the derivative of the height profile exceeds a maximum value at a certain location, it may be inferred therefrom that there is a height jump, i.e. an edge.

This geometrical factor hence could also be referred to as a tangential measurement resolution.

If, differing from the embodiment shown in FIG. 2, a light sectioning measurement means or light source 24 not projecting in a radial direction onto the surface of the material strip 4 were used, the tangential shift due to the non-radial irradiation of the laser can be taken into account for increasing the measurement accuracy. This results from the fact that the diameter of the wound material increases from sheet to sheet. For example, if a height value $H_1(P_1)$ associated with the position value is assumed for the pixel $P_1$ and/or the position value $P_1$ associated with the starting edge, and a height value $H_2(P_2)$ for the pixel $P_2$ associated with the end edge or the end, i.e. the height difference is $\Delta H = H_1(P_1) - H_2(P_2)$, simple geometrical considerations lead to a correction value of $K = \Delta H \times TAN(\alpha)$.

The bottom illustration of FIG. 2 exemplarily shows a situation as it arises after completely winding up a material strip 4, wherein the lower illustration in FIG. 3 shows the height profile corresponding to the complete winding. As can be taken from FIG. 3, at the end of the measurement, i.e. after a height profile covering the end of the wound materials strip was created, the height profile is again at a level lower than the maximum level observed, which is due to the observed overlap area. This means that the height profile has the overlap and/or the jump marking the beginning of the overlap at the position 66, at which the material strip overlaps with itself, wherein the height profile again drops to the level before the beginning of the overlap after the end of the winding operation and/or with the end of the material strip, because the laser light now is only scattered by the surface of the material strip wound once. The overlap and/or the overlap length may thus be determined as the distance measure 68 with high precision. Here, both the measure in the height profile and on the surface of the material is understood as the distance measure.

In the lower illustration of FIG. 2, this fact is outlined by the height value reached prior to the end of the capture as a maximum being illustrated in dashed lines in the 2-dimensional sensor capture of the lower illustration.

As can be taken from the description in FIGS. 1 to 3, in some embodiments of the invention a system for generating measurement data allowing for the creation of a height profile during the winding operation is thus employed. The measurement system works with an internally (free-running) or externally triggered measurement camera, wherein the individual measurements take place in equidistant or known step sizes on the material and/or on the drum casing area or the surface of the wound material strip. Here, the sensor and/or the measurement system may be operated at a constant measurement frequency, i.e. without an external trigger impulse, or the measurement may be triggered externally, for example by a small wheel running along on the circumference of the rotation means and/or the drum 2 so that the recorded data have a known tangential measurement distance to the material to be examined. Alternatively, a rotation indicator built in the drum 2, which triggers the individual captures, may be used. In alternative embodiments, a geometrical measurement system measuring line by line, such as a laser light sectioning measurement system, is used, which not only allows for one-dimensional display and/or the one-dimensional creation of a height profile, but permits complete 2D detection of the winding drum and of the material during the winding operation. This measurement system may also work with an internally (free-running) or externally triggered measurement camera, so that it is ensured that the line-by-line measurements are equidistant and/or correspond to known locations, i.e. correspond to known step sizes on the material and/or on the drum casing area.

The secure detection of the material edge and/or the end of the material strip is based on the fact that the complete information is present in the form of a height profile, and that a special evaluation algorithm capable of detecting an edge and/or a material step or the beginning and end may be used. This evaluation algorithmics does not work point by point on the basis of a single measurement point, but is applied to composite "height data", i.e. to height profiles, which may be created in one or in two dimensions. Hence, the evaluation is performed asynchronously after the data capture.

In some embodiments, the evaluation of the height profile may be commenced already with the beginning of the winding operation, and/or as soon as the height profile covering the beginning of the material strip has been created. The complete evaluation, however, takes place only after completion of the entire winding operation and/or when the end of the material strip is included in the height profile.

Ideally, an end edge cannot be detected in a butt-wound material strip and/or material strip overlapping with chamfered edges, since it is exactly the aim of this kind of winding of the material strip to prevent the occurrence of such an edge. In contrast to conventional, point-wise and/or threshold-value-comparison-based measurement methods, in some embodiments of the invention, here a positive acknowledgement of the winding process can be performed in that it is observed that a homogenous and smooth surface exists in the area in which the end of the material strip is expected. This may be verified because the complete height information and/or a complete height profile of the material strip is available.

Hence, the detection accuracy and/or the precision of the control of the winding progress can be increased significantly as opposed to such methods directed at the detection of an edge and drawing the conclusion that the winding has taken place seamlessly only in case of the non-detection thereof. Since the detection of an edge, which such systems are focused on, needs exceeding a threshold value, these systems are clearly less sensitive in seamlessly wound or obliquely overlapping starting and end areas. This means that small jumps in height, which may occur in the case of imperfect winding, remain undiscovered in the conventional systems.

In other words, for some examples of the automatic recognition of the end of the material strip and/or the material end edge described here, use is made of the finding that the material end edge sought can only be localized for a certain tolerable range near the starting edge plus one exact drum revolution, so that it may be logically distinguished between the material end edge sought or the end of the material and other artifact structures (as far as these occur). When using a 2-dimensional geometrical measurement method, further improvement in the edge detection security can be achieved by additional correlation of the measurement points of various neighboring measurement tracks, as already described in the previous paragraphs.

In summary, the algorithm used for the evaluation of the measurement data can be summarized briefly as follows. At first, a position value and/or a pixel coordinate for the beginning or the starting edge $P_1(n)$ is determined in the height profile. Here, for reducing the computational sensitivity, the search for this edge may be limited to an area within which the beginning of the material strip needs to lie due to the geometrical framework conditions.

In some embodiments, the expected pixel position and/or the expected position value of the end and/or the end edge may then be extrapolated from the position value $P_1(n)$ by the addition of a complete revolution to a position value $P_1'(n)$.

Then, analysis of the position value in the surrounding of the extrapolated position value $P_1'(n)$ is performed to determine the end and/or, if present, an end edge $P_2(n)$ and/or an end value associated therewith.

The tangential distance $T(n)$ may be determined from these two position values either directly in metric units or in units of position values. In the one case, the difference $T(n)$ of the position values is to be determined directly, in the case of metric units this difference may also be multiplied by the tangential measurement resolution A.

Unless the laser light projection is in a radial direction, the overlap length may still be corrected by the correction value $K(n)$, which is due to the tangential shift of the determined edge positions.

Figure 4A:
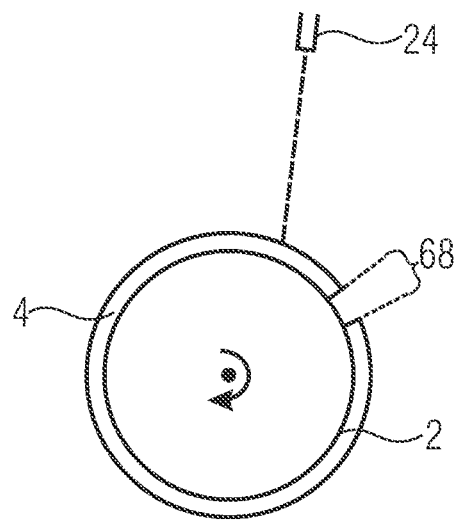
FIG. 4a shows an example with a negative distance measure.
Figure 4A:
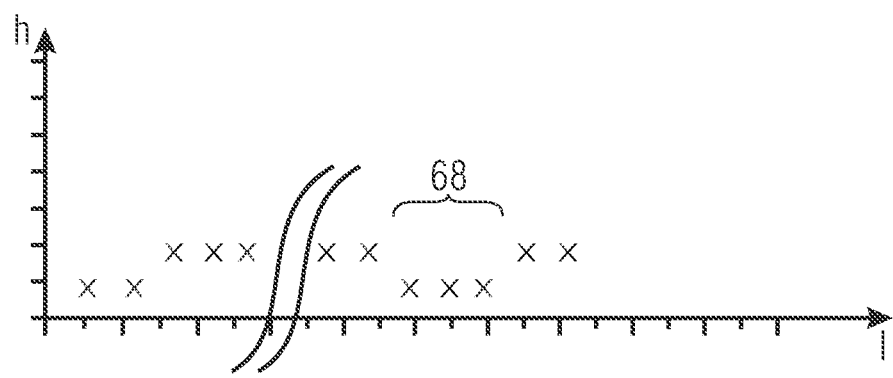

FIG. 4a shows a case of application in which a negative distance measure 68 is determined, since the material strip does not overlap itself at its end, but a gap remains between the starting edge and the end edge and/or between the beginning and the end of the material strip. As can be seen in the height profile illustrated in FIG. 4a, in this case the height level in the height profile again falls back to the initial value in the area associated with the distance measure 68, because there is no additionally wound material here. By way of the above-described evaluation of the complete information in the height profile, it is easily possible to determine a distance measure also in the case of a gap. Whether this is distinguished from the case of the overlap by positive or negative signs is convention. Both alternatives are possible.

Furthermore, FIG. 4a shows that the laser does not necessarily have to irradiate radially onto the surface of the material. Rather, in some embodiments, it may be advantageous for laser and/or measurement light projections not to be generated in a radial direction, in order to enhance the height resolution. For the same reason, it is also possible to arrange the camera, by means of which the light projection is observed, in arbitrary angles relative to the radial direction. Furthermore, in some embodiments, the light measurement strip may not run axially, i.e. parallel to the width direction, on the surface of the wound material strip, as indicated in the previous figures. Rather, an arbitrary angle of this light measurement strip with respect to the width and/or axial direction is possible. Thereby, in some embodiments, the height resolution may be enhanced further in the evaluation because, even in the case of an edge wound in parallel to the width direction, the projection of the light measurement beam on a 2-dimensional sensor is imaged in different pixel lines for respectively neighboring measurement tracks due to the "tilted" light measurement beam. Thereby, in some embodiments, additional interpolation between the pixel positions on the sensor may be used so as to even enhance the height resolution if the laser beam is tilted.

Figure 4B:
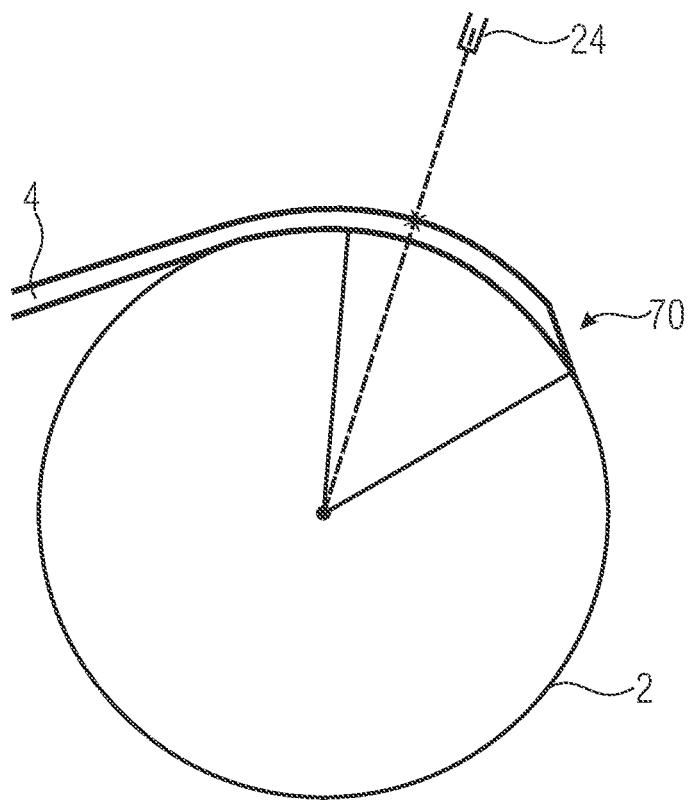
FIG. 4b shows a further example of a height profile.
Figure 4B:
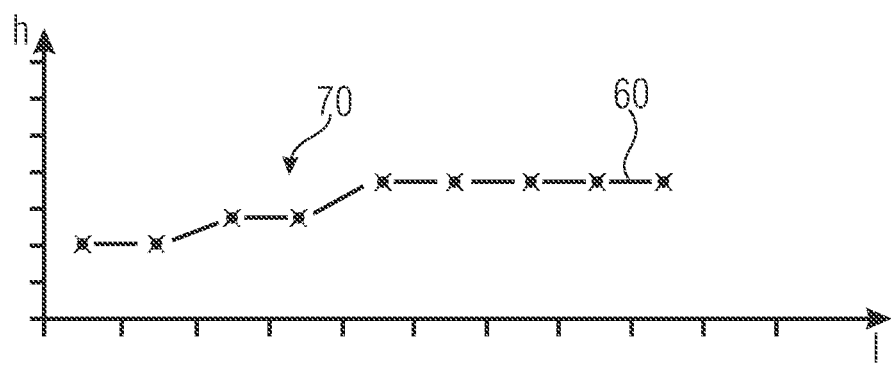
Figure 5:
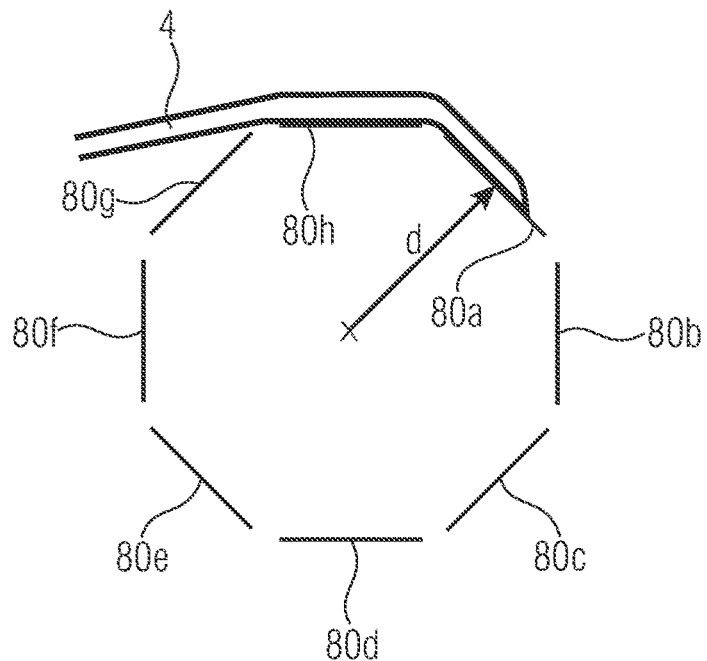
FIG. 5 shows an alternative example of rotation means for winding a material strip.

FIGS. 4b and 5 show two further measurement scenarios, wherein the edge course can be determined reliably only through the employment of the inventive method and/or through the use of an inventive apparatus, since there are boundary conditions complicating the geometry. In the example shown in FIG. 4b, the example of a material strip 4 the front and maybe also the rear edge of which is chamfered is illustrated, as already partially discussed in the preceding paragraphs. In the case shown in FIG. 4b, the beginning of the winding-up of a material strip 4 with a chamfered edge is illustrated in the upper image, wherein the lower illustration shows the one-dimensional height profile corresponding thereto. As can be taken from the illustration, the relative change in height and/or the relative change of the height values in the height profile is comparably small in the starting area 70, in which the material strip is chamfered, so that the edge detection, which aims at the change of neighboring height measurement points and/or jumps in height, will have difficulties with determining the exact position of the edge here.

By way of the evaluation of the height profile, it becomes possible to use the complete information of the analysis as a basis for defining such a criterion adapted to the application. For example, when fitting a parametrization to the height profile, the beginning may be defined as the actual beginning of the strip, or also as half the increase in the height profile, if this is more appropriate for the purposes to be achieved.

FIG. 5 shows a configuration that frequently occurs in practice, in which a material strip from elastic material, such as rubber, is wound onto a surface that is not perfectly cylindrical. Rather, eight linear segments 80a to 80d (wherein this number may vary arbitrarily), the distance d of which to a rotation center may be varied to change the diameter of the body onto which the material strip is being wound are used in FIG. 5. Here, upon completed winding, the cylindrical geometry is produced by the self-elasticity of the material used.

In such an application scenario, the use of conventional methods, which aim at detecting only an edge, is impossible. This is due to the fact that the body used for winding itself already has a plurality of edges, for example between the segments 80a and 80b, which would each be found by the edge-based methods. Due to the multiplicity of such edges, no sensible statement on the wound material itself is possible any more. Even when the edges have already been covered by a sheet of wound material, sensible evaluation is not possible with these conventional methods, because edges in the wound material strip, which could again erroneously lead to interpreting this edge as an end edge of the material strip, are each caused in the wound material strip by the section-wise linear segments at the segment boundaries. If the height profile is known, individual contributions may be distinguished reliably, however.

In summary, a system for winding a material strip onto a body in a tangential direction thus may be characterized as follows, for example:

Example of an instrumental prerequisite of the entire system:
Supply means
Winding drum
Sensor for line-wise measurement of the radial height change of the drum (3D geometrical measurement system)
The sensor is triggered internally (free-running at constant measurement frequency) or externally (e.g. with a distance indicator on the drum), so that the captured data have a known tangential measurement distance on the material to be examined. (An external triggering impulse of the capture may, for example, be generated by a little wheel running along on the drum surface. Alternatively, a rotation indicator directly connected to the winding drum may be used. The tangential measurement resolution may, for example, be calibrated by means of suitable apparatuses and methods prior to the actual measurement.)

Start of the winding operation and start of the line-wise recording of the 3D height data of a measurement sensor.

Transmission of the measurement data to an evaluation unit either in portions or completely following the capture, and assembling the measurement data to an overall representation.

Detection of the pixel coordinates of the starting edge $P1(n)$ in all measurement tracks n in the overall representation or in the partial representations by 1- or 2-dimensional edge detection algorithms on the evaluating unit, possibly also using a-priori information on the expected pixel position of the starting edge and its angular orientation with respect to the axial direction.

Extrapolation of the pixel coordinates $P1(n)$ of the starting edge to the pixel position of the starting edge after one revolution of the drum $P1'(n)$;

Detection of the pixel coordinates of the end edge $P2(n)$ in the direct surrounding of the pixel positions $P1'(n)$;

Determination of the difference values $D(n)$ of the coordinates $P1'(n)$ and $P2(n)$;

Determination of the tangential distances $T(n)$ in metric units, corresponding to the difference values $D(n)$, by multiplication of the difference values $D(n)$ by the tangential measurement resolution A;

If applicable, correction $K(n)$ of $T(n)$ due to tangential shift of the determined edge positions in case of a non-zero angle between surface normal and angle of incidence of the laser (only for laser light sectioning).

Calculation of the overlap length values in a tangential direction $Ü(n)+K(n)$.

Calculation of the overlap length perpendicular to the material edge by projection of the overlap length in the edge direction with the aid of $\cos(\alpha)$; $\alpha$ is the angle between the axial direction and the material edge.

Figure 6:
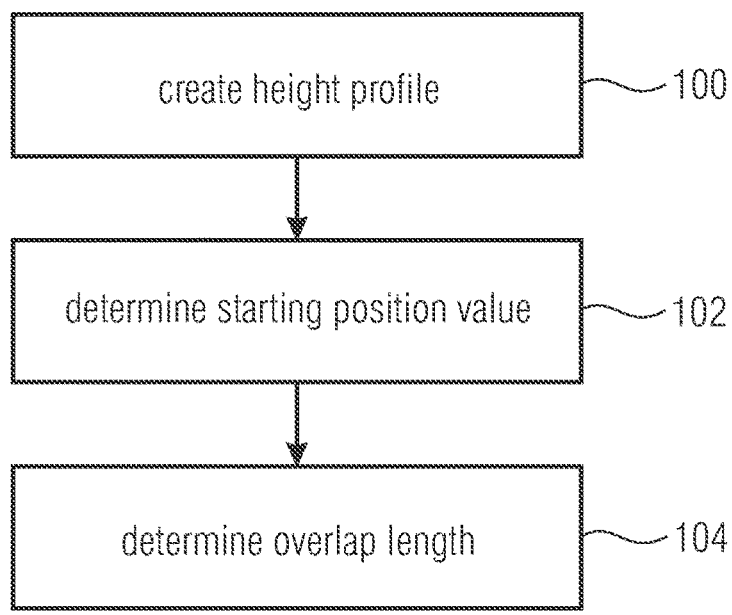
FIG. 6 shows an embodiment of a method of determining a distance measure.

An embodiment, underlying the instrumental realization, of a method of determining an overlap length of a material strip wound onto a body in a tangential direction may be characterized as follows, as also illustrated on the basis of FIG. 6.

In a profile step 100, at first a height profile of a surface of the material strip, which covers the beginning and the end of the wound material strip in the tangential direction, is created.

In a detection step 102, a position value of the beginning of the material strip is determined in the height profile.

In an evaluating step 104, the overlap length of the material strip is determined on the basis of the determined position value of the beginning and the height profile covering the end of the material strip.

Although a few possibilities of edge detection have been discussed on the basis of the previous embodiments, of course it is possible to apply further criteria within the height profile, in order to detect an edge and/or the beginning of a material strip. For example, the surroundings of all captured measurement points can be examined and evaluated with respect to a change in the slope. For example, edges would then be determined by the fact that this change in slope has a relative maximum value.

In 2-dimensional height profiles, the correlation between axially (i.e. in the width direction) neighboring edge detection results may be provided in a sensor capturing in a line-wise manner. Thereby, potentially faulty values, i.e. erroneously detected edge position values, may be blocked out logically (for example loose threads). Furthermore, the group of points of the detected edge position values may be combined into a common curve which may be smoothed as a whole by means of further evaluating operations. The smoothing reduces the remaining noise, i.e. potential measurement inaccuracies, among other things. Furthermore, although not expressly shown in the previously described embodiments, a special light sectioning measurement camera can be used, which performs pre-evaluation of the two-dimensional image of the sensor element matrix so as to output, per measurement track (column of the detector), only that pixel value and/or height value corresponding to the position of the light measurement strip in the sensor element matrix, for example.

In some further embodiments, the result values of the overlap lengths may also be combined to an overall curve, which may be supplied to further logical or quality checks, for example for evaluating tolerance overshoots within a certain evaluation interval.

When using materials and/or material strips having no "perpendicular", but chamfered cutting edges in the splice area, the position and/or the position value corresponding to the "upper" transition between an oblique cutting area and a "flat" strip surface can be determined by means of the evaluating algorithmics. Such materials are often wound in a "blunt splice", i.e. with a splice overlap of zero length.

For such a case of intentional blunt splice, ideally no material end edge can be detected, since the material joins practically seamlessly. In some embodiments, the material end edge may hence be searched for within a certain tolerance window around the expected position, and in case of failed edge detection and/or in case of a steady, smooth surface area and/or height profile in this region, it may be inferred therefrom that the blunt splice has been wound as desired. When employing a sensor with a multiplicity of measurement tracks across the axial width, the material strip can be sensed across the entire axial width. In this case, not only the measurement of the overlap length, but also, e.g., the detection of the lateral edges of the material strip is possible, which may be used for determining the material width, the axial offset of the material, folded-over material edges, partially open splice and splice angles relative to the axial direction.

In further embodiments, on the basis of the 2-dimensional height profile, the distance measure and/or the overlap can be determined alone with the knowledge of the part of the height profile covering the beginning and the end of the wound material strip, for example by fitting a suitable parametrization of a 2-dimensional height profile to this area. From the parameters determined by fitting, the distance measure of the overlap can be determined, without directly observing the placement of the material strip (the production of a beginning and/or a starting edge) in the height profile. Only the part of the next sheet covering the beginning is detected in the height profile, wherein the underlying beginning and/or its position value can be determined with suitable parametrization.

Given a suitable choice of the geometry, a spatial resolution in a tangential direction better than 0.5 mm, according to further embodiments even better than 0.25 mm, can be generated by embodiments of the inventive method and/or when using embodiments of inventive apparatuses. Depending on the number of measurement tracks, i.e. depending on the sensor and/or light sectioning sensor used or tactile measurement methods, the resolution in the width direction can be adapted variably to the requirements by using either another imaging scale, sensors with higher resolution and/or a greater number of tactile sensors. Thus, for example, spatial resolutions better than 0.5 mm or even better than 0.25 mm can be achieved with some embodiments of the invention.

Likewise, by way of the suitable choice of the sensor and/or the geometry of the light sectioning measurement method, a height resolution better than 0.5 mm or even better than 0.1 mm can be achieved when the thickness of the material strips to be examined varies between 1 mm and 10 mm. Generally speaking, a height resolution at least 5 or 10 times greater than the thickness of a material examined can be achieved.

Depending on the conditions, embodiments of the inventive method of determining an overlap length of a material strip wound onto a body in a tangential direction may implemented in hardware or in software. The implementation may be on a digital storage medium, particularly a disk or CD with electronically readable control signals capable of cooperating with a programmable computer system so that an embodiment of the method of determining an overlap length of a material strip wound onto a body in a tangential direction is executed. In general, the invention thus also consists in a computer program product having program code stored on a machine-readable carrier for performing the method, when the computer program product is executed on a computer. In other words, the invention may thus also be realized as a computer program having program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method of determining a distance measure between a beginning of a material strip and an end of the material strip wound onto a body in a tangential direction by a winding operation, comprising:

creating, by a sensor device, a height profile of a surface of the material strip, wherein the height profile covers the beginning of the wound material strip and the end of the wound material strip in the tangential direction, wherein the height profile is created using a signal recorded by the sensor device during the winding operation, wherein height information associated with respective position values is determined and stored for a plurality of position values known or being equidistant in a tangential direction to obtain a stored height profile;

determining, by an evaluator, a position value of the beginning of the material strip in the stored height profile; and determining, by a determiner, the distance measure by using the position value of the beginning and a range of the stored height profile covering the end of the material strip, wherein the determining the distance measure comprises extrapolating the position value of the beginning of the material strip in the stored height profile to an extrapolated position value in the stored height profile by adding a complete revolution of the body to the position value of the beginning of the material strip in the stored height profile, performing an analysis of the position values in the stored height profile only in the range surrounding the extrapolated position value in the stored height profile in order to find a position value of the end of the material strip, so that the end of the material strip in the stored height profile is logically distinguished from artifacts occurring outside of the range surrounding the extrapolated position value in the stored height profile, and determining, as the distance measure, a tangential distance between the position value of the beginning of the material strip in the stored height profile and the position value of the end of the material strip in the stored height profile; and wherein at least one of the sensor device, the evaluator, and the determiner comprises a hardware implementation.

2. The method according to claim 1, wherein no height profile is created in an intermediate area lying between the beginning of the material strip and the end of the material strip in a tangential direction.

3. The method according to claim 1, wherein a position value of a starting edge of the material strip corresponding to the beginning of the material strip or a position value of an end edge of the material strip corresponding to the end of the material strip is determined in the stored height profile, when an absolute value of a difference of the height values of two position values adjacent in a tangential direction in the stored height profile exceeds a predetermined maximum value.

4. The method according to claim 1, wherein when determining the position values of the starting edge of the material strip corresponding to the beginning of the material strip or determining the position value of the end edge of the material strip corresponding to the end of the material strip, a parameterization describing an edge course is fitted to the stored height profile.

5. The method according to claim 1, wherein when determining the distance measure, a length value is generated from the position values at the beginning of the material strip in the stored height profile and the position value at the end of the material strip in the stored height profile, wherein a geometrical correction value is taken into account.

6. The method according to claim 5, wherein when determining the distance measure, a difference of the position values at the beginning of the material strip in the stored height profile and the position value at the end of the material strip in the stored height profile is combined with the correction value.

7. The method according to claim 1, wherein the height profile is created by means of a contactless or tactile measurement method.

8. The method according to claim 7, wherein the measurement method is a light sectioning measurement method.

9. The method according to claim 1, wherein the stored height profile is a two-dimensional height profile comprising height values for a plurality of measurement tracks, wherein the plurality of measurement tracks are arranged adjacently with respect to each other in a width direction passing perpendicularly to the tangential direction.

10. The method according to claim 9, wherein for determining a height value associated with a measurement track at a predetermined position value, additional height information, associated with the predetermined tangential position value, of a measurement track adjacent in the width direction is taken into account.

11. The method according to claim 9, wherein, for determining the position value at the beginning of the material strip in the stored height profile and the position value at the end of the material strip in the stored height profile, a parameterization describing a line or area is fitted to the two-dimensional height profile.

12. An apparatus for determining a distance measure between a beginning of a material strip and an end of the material strip wound onto a body in a tangential direction by a winding operation, comprising:

a sensor device formed to create a height profile of a surface of the material strip, wherein the height profile covers the beginning of the wound material strip and the end of the wound material strip in the tangential direction, wherein the height profile is created using a signal recorded by the sensor device during the winding operation, wherein height information associated with respective position values is determined and stored for a plurality of position values known or being equidistant in a tangential direction to obtain a stored height profile;

an evaluator formed to analyze the stored height profile so as to determine a position value of the beginning of the material strip in the stored height profile; and a determiner formed to determine the distance measure using the position value of the beginning of the material strip in the stored height profile and a range of the stored height profile covering the end of the material strip in the stored height profile;

wherein the determiner is configured to extrapolate the position value of the beginning of the material strip in the stored height profile to an extrapolated position value in the stored height profile by adding a complete revolution of the body to the position value of the beginning of the material strip in the stored height profile, to perform an analysis of the position values in the stored height profile only in the range of the stored height profile surrounding the extrapolated position value in the stored height profile in order to find a position value of the end of the material strip in the stored height profile, so that the end of the material strip in the stored height profile is logically distinguished from artifacts occurring outside of the range surrounding the extrapolated position value in the stored height profile, and to determine, as the distance measure, a tangential distance between the position value of the beginning of the material strip in the stored height profile and the position value of the end of the material strip in the stored height profile.

13. A non-transitory storage medium having stored thereon a computer program with a program code for performing, when the program is executed on a computer, a method of determining a distance measure between a beginning of a material strip and an end of the material strip wound onto a body in a tangential direction by a winding operation, the method comprising:

creating a height profile of a surface of the material strip, wherein the height profile covers the beginning of the wound material strip and the end of the wound material strip in the tangential direction, wherein the height profile is created using a signal recorded by the sensor device during the winding operation, wherein height information associated with respective position values is determined and stored for a plurality of position values known or being equidistant in a tangential direction to obtain a stored height profile;

determining a position value of the beginning of the material strip in the stored height profile; and determining the distance measure by using the position value of the beginning of the material strip in the stored height profile and a range of the height profile covering the end of the material strip, wherein the determining the distance measure comprises
extrapolating the position value of the beginning of the material strip in the stored height profile to an extrapolated position value in the stored height profile by adding a complete revolution of the body to the position value of the beginning of the material strip in the stored height profile, performing an analysis of the position values in the stored height profile only in the range surrounding the extrapolated position value in the stored height profile in order to find a position value of the end of the material strip, so that the end of the material strip in the stored height profile is logically distinguished from artifacts occurring outside of the range surrounding the extrapolated position value in the stored height profile, and determining, as the distance measure, a tangential distance between the position value of the beginning of the material strip in the stored height profile and the position value of the end of the material strip in the stored height profile.

14. A system for winding a material strip onto a body in a tangential direction by a winding operation, comprising:

a rotator coupled to the body and formed to set the body to rotation in a tangential direction and wind up the material strip; and a control device for determining a distance measure between a beginning of the material strip and an end of the material strip wound onto the body in the tangential direction, the control device comprising:

a sensor device formed to create a height profile of a surface of the material strip, wherein the height profile covers the beginning of the wound material strip and the end of the wound material strip in the tangential direction, wherein the height profile is created during using a signal recorded by the sensor device the winding operation, wherein height information associated with respective position values is determined and stored for a plurality of position values known or being equidistant in a tangential direction to obtain a stored height profile;

an evaluator formed to analyze the stored height profile so as to determine a position value of the beginning of the material strip in the stored height profile; and a determiner formed to determine the distance measure using the position value of the beginning of the material strip in the stored height profile and a range of the stored height profile covering the end of the material strip in the stored height profile, wherein the determiner is configured
to extrapolate the position value of the beginning of the material strip in the stored height profile to an extrapolated position value in the stored height profile by adding a complete revolution of the body to the position value of the beginning of the material strip in the stored height profile, to perform an analysis of the position values in the stored height profile only in the range of the stored height profile surrounding the extrapolated position value in the stored height profile in order to find a position value of the end of the material strip in the stored height profile, so that the end of the material strip in the stored height profile is logically distinguished from artifacts occurring outside of the range surrounding the extrapolated position value in the stored height profile, and to determine, as the distance measure, a tangential distance between the position value of the beginning of the material strip in the stored height profile and a range of the stored height profile covering the end of the material strip in the stored height profile.

15. The system according to claim 14, wherein the signal recorded by the sensor device during the winding operation comprises light projected onto the surface of the material strip.

16. The method according to claim 1, wherein the signal recorded by the sensor device during the winding operation comprises light projected onto the surface of the material strip.

17. The apparatus according to claim 12, wherein the signal recorded by the sensor device during the winding operation comprises light projected onto the surface of the material strip.

18. The non-transitory storage medium according to claim 13, wherein the signal recorded by the sensor device during the winding operation comprises light projected onto the surface of the material strip.

* * * * *